Sept. 14, 1926.
V. A. FYNN
1,599,757
SYNCHRONOUS MOTOR
Filed Feb. 18, 1924
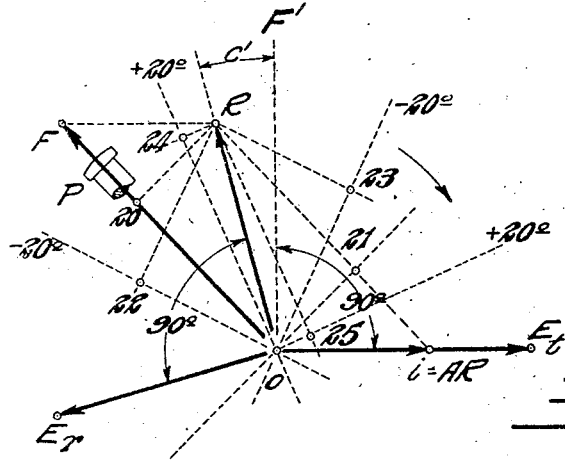
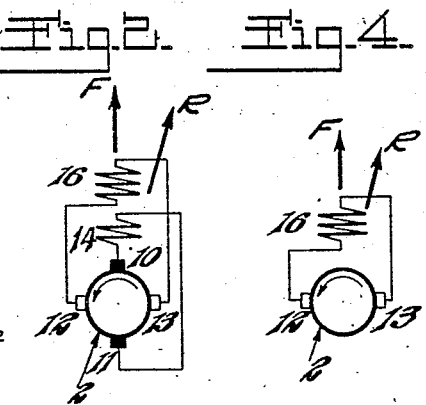
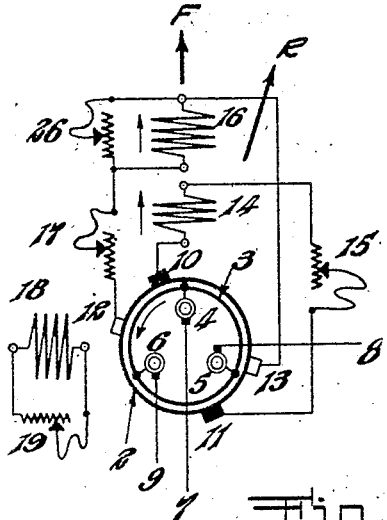
Inventor:
VALÈRE ALFRED FYNN.
By John W. Bruninga
Attorney.

Patented Sept. 14, 1926.

1,599,757

UNITED STATES PATENT OFFICE.

VALÈRE ALFRED FYNN, OF ST. LOUIS, MISSOURI.

SYNCHRONOUS MOTOR.

Application filed February 18, 1924. Serial No. 693,561.

My invention relates to the starting and operating of dynamo electric machines in which a revolving field of more or less uniform magnitude is produced at least during the starting period. It relates more particularly to polyphase synchronous induction motors.

The objects and features of this invention will appear from the detail description taken in connection with the accompanying drawings and will be pointed out in the claims.

In the accompanying diagrammatic drawings Fig. 1 is a two-pole three-phase embodiment of the invention and Figs. 2 to 9 inclusive are explanatory two-pole diagrams.

Referring to Fig. 1, the rotor carries a three-phase winding 3 adapted to be connected to the three-phase supply 7, 8, 9 through the slip-rings 4, 5, 6 and a commuted winding 2 with which co-operate two sets of brushes 10, 11 and 12, 13; these brush sets are displaced by more or less than 90 electrical degrees according to which of the brushes this statement refers. Thus if reference is had to brushes 10 and 12, the displacement is less and if reference is had to brushes 10 and 13, it is more than 90 degrees. The result is the same. We will say that the brushes in Fig. 1 are displaced by less than 90 degrees. The stator carries an exciting winding 16 connected to the brushes 12, 13 with the interposition of an adjustable resistance 17, and a compounding winding 14 coaxial with 16 and connected to the brushes 10, 11 through the adjustable resistance 15. The exciting winding can be shunted and short-circuited by means of the adjustable resistance 26. The starting winding 18, also located on the stator, is displaced 90 electrical degrees from the exciting and compounding winding and can be shunted and short-circuited by means of the adjustable resistance 19. This winding, together with 14 or 16 or with both of these, forms a polyphase arrangement of windings on the secondary.

To start this motor, resistance 26 may be omitted in which case resistances 19 and 17 and, if desired, 15 are set to give as nearly balanced two-phase induction motor torque as possible when the primary is connected to a source of phase-displaced voltages. As the motor gathers speed the resistances can be diminished in one or more steps, 19 being finally short-circuited and 15 and 17 set to their synchronizing and then to their operative values or directly to the latter. Near synchronism, the motor develops a very powerful synchronizing torque through the interaction of the primary revolving flux produced by the polyphase currents in the primary 3 and the currents introduced into the windings 14 and 16 by conduction from the commuted winding 2. After synchronism is reached, both auxiliary or brush voltages become unidirectional and they supply the unidirectional magnetization to the secondary. While not strictly correct, it is convenient to refer to the brushes 10, 11 as the "compounding" and the brushes 12, 13 as the "exciting" brushes. The power factor variation with load can be influenced and varied within wide limits by changing the relation of the ampereturns in 16 and 14 with reference to the ratio of the exciting to the compounding voltages or by displacing one or both brush sets or by two or more of the methods according to circumstances and with due regard to the best utilization of the copper in the commuted winding and the value and conformation of the synchronizing torque.

A more uniform induction motor torque can be had at starting and the commutator can be relieved of much of the starting current if the winding 16 is shunted by the resistance 26 during the early stages of the starting operation. In that case, it is best to give 15 and 17 a high value at the moment of starting. As the speed increases, the values of 15, 17 and 19 are reduced and that of 26 increased and this resistance finally disconnected. These changes can be made in one or more steps according to the size of the motor.

When the brushes 10, 11 are coaxial with the winding 14, the latter will produce in conjunction with the primary revolving flux a strictly unidirectional pulsating torque and the same holds true of the brushes 12, 13 and the winding 16. When the brush axis is displaced from the winding to which the brushes in that axis are connected, then the synchronizing torque exhibits a unidirectional pulsating and an alternating component of double slip frequency with equal positive and negative maxima. The latter increases as the displacement increases and when the displacement reaches 90 electrical degrees the amplitude of the alternating torque component is a maximum and the unidirectional torque is nil. For a displacement of about 60 degrees, the maxima of the unidirectional and alternating component are about equal and the positive maxima of the resultant torque are greater than its negative maxima. Thus if in Fig. 1 both brush sets are displaced by less than 60 degrees from the axis of 14 and 16, the maxima of the resultant synchronizing torque will be in excess of its negative maxima. This condition is still further improved and the negative maxima of the resultant torque still further reduced as compared to its positive maxima by so dimensioning 14 that with the brush voltage available during the synchronizing period and an appropriate setting of the resistance 15 this winding will develop a larger positive synchronizing torque than the winding 16. This consideration shows that in order to get as uniform a resultant torque as possible and particularly in order to reduce the maxima of the negative torque impulses to less than the maxima of the positive torque waves, it is necessary to have the brush axes coincide as nearly with the axes of 16 and 14 as the desired operating characteristic will allow. Whenever the negative maxima of the resultant synchronizing torque do not exceed about 18 per cent of its positive maxima said synchronizing torque will be found highly satisfactory in practice and can be considered as substantially unidirectional. At that time the amplitude of the unidirectional component of the resultant synchronizing torque is about twice that of its double frequency alternating component.

In order to more clearly explain how the operating or compounding or power factor characteristic can be affected, reference will be had to Fig. 2 which shows a motor heretofore proposed. I have discovered that satisfactory compounding cannot be obtained unless the ampereturns in 14 and 16 are given a ratio which differs from the ratio of the compounding to the exciting voltages impressed on these windings. Assuming a motor with the constants underlying the phase and space diagram of Fig. 3, it is easy to calculate that in order to preserve unity power factor from, say, .5 to 43 amperes, it is necessary for the unidirectional magnetization, or the total ampereturns, produced by the secondary windings 14, 16 to rise in the proportion of 1 to 1.52, whereas the compounding arrangement of Fig. 2 only yields a rise of 1 to 1.17 if the ratio of the unidirectional ampereturns in 14 and 16 is 1 to 10 or the same as that of the voltages which determine said ampereturns. If the ratio of ampereturns in 14 to that in 16 is made 1 to 5 when the ratio of the compounding to the exciting voltage is still 1 to 10, then the change in the sum of the exciting and compounding ampereturns, which, disregarding saturation, is proportional to F, would vary from 1 to 1.48 if produced by the exciting and compounding voltages available when the actual unidirectional flux F in the machine is generated by means of separate excitation and varied so as to keep the power factor at unity for all loads. If, under the circumstances named, the sum of said ampereturns rose from 1 to 1.52, it would indicate that the machine would automatically produce unity power factor at 5 and at 43 amperes load, although the power factor might differ from unity for intermediate current or load values. This is merely a simple way of explaining the effect of the adjustments forming part of the present invention and the above assumption underlies all the following explanatory statements relating to the variation of the compounding and the exciting voltages and secondary ampereturns with varying load.

The vector diagram of Fig. 3 is drawn for a current of 30 amperes and on the assumption that a vector leading another is to be shown in advance of the latter in a clockwise direction. For unity power factor the current $i$ will be in phase with the terminal voltage $E_t$. The phase displacement and magnitude of the back E. M. F. $E_r$ is determined by the electrical time constant of the primary and the resultant magnetization R must be at right angles to $E_r$ and lead same. The phase or space position of F, the total unidirectional magnetization produced by 14 and 16, is found as the second side of a parallelogram of which the armature reaction AR is the other and R the resultant. AR can be represented by the same vector as the primary current $i$. For some load and excitation the vectors R and F are also shown in Fig. 2 in their correct space relation to the axes of the exciting and compounding windings and to the two brush axes. It will be seen that as the load decreases R and F come closer and closer together without ever coinciding in a practical machine and while F always remains coaxial with 14 and 16. Since the brush voltages are determined by the resultant motor magnetization R, however produced, then the magnitude of the exciting and compounding voltages can be determined when the magnitude and space position or phase of R are known. For the case of Fig. 2 the compounding voltage is proportional to that component 0—21 of R which is perpendicular to F and the exciting voltage is proportional to that component 0—20 of R which coincides with F.

If the compounding brushes 10, 11 are removed, as shown in Fig. 4, and F varied from 1 to 1.52 independently of the voltage at the brushes 12, 13 and as necessary to preserve unity power factor from 5 to 43 amperes load, the voltage at the brushes 12, 13 would vary from 1 to 0.8 showing that, if said brushes were connected to the winding 16 the combination could not be operated at anywhere near unity or leading power factor over any range of load.

Now I have found that the compounding characteristic can also be varied by displacing the brushes as shown in Figs. 5, 6, 7, 8 or 9 and with the following results. Again assuming that in all cases F is in some way varied with the load current so as to preserve unity power factor the sum of the exciting and the compounding voltage will then vary from 1 to 1.32 if the compounding brushes are displaced 20 degrees against rotation when the primary revolves, which means with rotation when the secondary revolves. See Fig. 5. This is a material improvement over the performance of Fig. 2, where the rise is only from 1 to 1.17 and the improved performance is to be had even when the ratio of the ampereturns in 14 and 16 is the same as that of the corresponding voltages. The vector 0—25 as compared to 0—21 of Fig. 3 shows the change in the corresponding voltage when the compounding brushes are moved 20 degrees against rotation of the primary as in Fig. 5. When moving the compounding brushes in this direction a position is soon reached for which the compounding voltage will be negative at light and positive at heavy loads, producing through the winding 14 a demagnetizing action in the first and a magnetizing action in the second instance.

If the compounding brushes are shifted 20 degrees in the direction of rotation of the primary, as in Fig. 6, then vector 0—23 of Fig. 3 will indicate the change in the compounding voltage and the resulting change in the sum of the exciting and compounding voltages is from 1 to 1.07, which is not as good as in the case of Fig. 2.

Similarly, in Fig. 7 the exciting brushes are moved 20 degrees against rotation. The magnitude of the exciting voltage changes from 0—20 to 0—24 in Fig. 3 and the result is about the same as in Fig. 5, the sum of the voltages varies from 1 to 1.31.

In Fig. 8 the exciting brushes are moved 20 degrees in the direction of rotation, the exciting voltage is now represented by the vector 0—22 of Fig. 3 and the sum of the voltages varies from 1 to 1.07.

In Fig. 9 the exciting and the compounding brushes are both moved 20 degrees against rotation, see vectors 0—24 and 0—25 of Fig. 3, and the sum of the voltages varies from 1 to 1.53.

This clearly indicates what can be achieved by the displacements shown and without resorting to a modification in the ratio of exciting and compounding ampereturns as compared to the ratio of the corresponding voltages.

There is one more point of interest in connection with the location of the brushes. When located as shown in Fig. 2, namely in line with and at right angles to the axis of 14, then the compounding voltage is very small at no load and will usually not reach a maximum at full load while the exciting voltage is a maximum at no load and diminishes as the load increases. This means that at full load or maximum load the copper of the commuted winding will be poorly utilized because of the great discrepancy in the compounding and exciting voltages. Whenever conditions permit, I therefore prefer to set the compounding brushes a little ahead of the axis of 14, when the primary revolves, and the exciting brushes a little back of the perpendicular to that axis as shown in Fig. 1. In this way the magnitude of the compounding and of the exciting voltages is made more nearly equal at full load. This can usually be done without sacrifice of the power factor characteristic and at a distinct gain in so far as synchronizing torque is concerned, particularly when the ratio of exciting to compounding ampereturns is made to differ from the ratio of the corresponding voltages.

When the axis of either brush set is displaced with relation to the axis of the exciting and compounding windings 16 and 14, then the phase of the voltage appearing at this set of brushes at sub-synchronous speeds and due to the revolving flux set up by the primary member will change with relation to the phase of the voltage generated in either secondary winding 14 or 16 by this same primary revolving flux. When the brush axis is coaxial with the axis of a secondary winding, then the brush voltage at speeds near the synchronous will be cophasal with the voltage generated in said secondary. When the brush axis is displaced by 90 electrical degrees from the axis of a secondary winding then the brush voltage near synchronism will be in phase quadrature with the voltage generated in said secondary. When the primary revolves and the brushes are connected and displaced as shown in Fig. 1, then the voltage appearing at the brushes 10, 11 leads the voltage generated in 14 and the voltage appearing at the brushes 12, 13 leads that generated in the winding 16. When the brushes 10, 11 are displaced as shown in Fig. 5, the voltage appearing at said brushes lags behind that generated in 14 at speeds near the synchronous by the revolution of the flux set up by the primary. Instead of expressing the desired relation between the axes of the secondary windings and the axes of the brushes to which they are connected in terms of space angles, this relation can be just as positively specified by reference to the phase of the brush voltage and the phase of the voltage generated near synchronism in the secondary winding on which said brush voltage is impressed.

In order to make full use of the properties of the improved motor I prefer to design both members without defined polar projections, using a small air-gap and well distributed windings as is usual in good induction motor practice. In that way a good starting, synchronizing and weight efficiency are secured.

The reason for showing the commuted winding 2 of Fig. 1 as separate from the three-phase winding 3 is to indicate that as a rule these two windings must be designed for very different voltages. In order to secure good commutation and avoid dangerously high voltages in the windings 14 and 16 at starting, it is necessary to make the maximum brush voltage much smaller than even the lowest usual distribution voltage applied to 3. There are various known modifications of such windings and these may be used instead of the arrangement shown in Fig. 1 without modifying the mode of operation of my improved motor.

While the discussion of the various conditions governing brush displacements and other adjustments are referred to a machine with revolving primary, and such are illustrated, it will be understood that the primary may just as well be stationary, in which case the secondary will revolve.

It is to be understood that a synchronous motor is a machine capable of operating at a constant and synchronous speed under varying load conditions and which does so operate. The synchronous motors described in this specification carry unidirectional ampereturns on their secondary and unless the organization of the machine is such as to permit, with changing torque demand, (1) of an angular displacement between the axis of said ampereturns and the axis of the resultant motor magnetization, or (2) of a change in the magnitude of said ampereturns or (3) of said angular displacement and of said change in magnitude, the motor cannot and does not run at a constant and synchronous speed under varying load conditions.

It is further to be understood that by "synchronous torque" is meant a torque exerted by a synchronous motor when in normal operation and therefore when running synchronously under load. By "synchronizing torque" is meant any torque adapted to or capable of bringing up to synchronism a motor capable of operating synchronously under varying load conditions. It is, for instance, known that an ordinary polyphase induction motor is a non-synchronous machine the torque of which falls off very rapidly as synchronism is approached and actually becomes zero at synchronism. It is also known that a polyphase induction motor can be so modified as to make it capable of operating synchronously under varying load conditions. any torque which, in a polyphase induction motor adapted to operate synchronously under varying load, will bridge the gap between the induction motor torque of the machine, which becomes zero at synchronism, and its synchronous torque is referred to as a "synchronizing torque".

A synchronous motor is said to be "compounded" when the unidirectional ampereturns on the secondary are smaller at light than at heavy loads. This change in the unidirectional ampereturns with changing load affects the power factor at which the machine operates. The change can be such that the power factor remains practically constant throughout the synchronous load range of the motor, or it can be such that the power factor is a leading one at light loads, that this lead diminishes with increasing load and is converted into a lag near the maximum synchronous torque of the machine. Either of these "compounding characteristics" are popular and right now the last named is probably more in demand.

While a theory has been advanced in connection with the machines referred to herein, this has been done with a view to facilitating their description and understanding and it is to be understood that I do not bind myself to this or any other theories.

It will be clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

Having thus described the invention, what is claimed is:

1. The method of operating a motor which carries variable load at synchronous speed, comprising, producing auxiliary voltages which are unidirectional at synchronism and which vary in magnitude when the motor load varies, impressing these auxiliary voltages on the secondary to produce coaxial magnetizations, and causing the resultant of these magnetizations to increase in magnitude when the motor load increases.

2. The method of operating a motor which carries variable load at synchronous speed, comprising, producing a primary flux which revolves with respect to the primary, causing the primary flux to generate induction-motor-torque producing ampereturns in a secondary circuit, producing two auxiliary voltages of slip frequency which differ in phase below synchronism and become unidirectional at synchronism, impressing one of these auxiliary voltages on a secondary circuit to produce a synchronizing torque and during synchronous operation a part of the secondary unidirectional magnetization, impressing the other of said auxiliary voltages on another circuit on the secondary to produce during synchronous operation another part of the secondary unidirectional magnetization, and causing both of these unidirectional magnetizations to so vary with varying load as to increase the total secondary unidirectional magnetization with increasing load.

3. The method of operating a motor which carries varying load at synchronous speed, comprising, producing a primary flux which revolves with respect to the primary, causing the primary flux to generate induction-motor-torque producing ampereturns in displaced secondary circuits, producing two auxiliary voltages of slip frequency which differ in phase below synchronism and become unidirectional at synchronism, impressing one of these auxiliary voltages on an induction-motor-torque producing secondary circuit to produce a synchronizing torque which reaches a maximum when the slip frequency auxiliary voltage is at or near a maximum and to produce during synchronous operation a part of the secondary unidirectional magnetization, impressing the other of said auxiliary voltages on another circuit on the secondary to produce during synchronous operation another part of the secondary unidirectional magnetization, and causing both of these unidirectional magnetizations to so vary with varying load as to increase the total secondary magnetization with increasing load.

4. The method of operating a motor which carries varying load at synchronous speed, comprising, producing a primary flux which revolves with respect to the primary, causing the primary flux to generate induction-motor-torque producing ampereturns in displaced secondary circuits, producing two auxiliary voltages of slip frequency, which differ in phase below synchronism and become unidirectional at synchronism, impressing one of these auxiliary voltages on one of the induction-motor-torque producing circuits, to produce a synchronizing torque and during synchronous operation a part of the secondary unidirectional magnetization, impressing the other of said auxiliary voltages on another circuit on the secondary to produce during synchronous operation another part of the secondary unidirectional magnetization along an axis substantially coinciding with that of the first part of said magnetization and causing both of these secondary unidirectional magnetizations to so vary with varying load as to increase the total secondary magnetization with increasing load.

5. A motor which carries variable load at synchronous speed, having a primary and secondary, means for producing auxiliary voltages which are unidirectional at synchronism and which vary in magnitude when the motor load varies, coaxial windings on the secondary, and means for impressing said auxiliary voltages on said coaxial windings, the circuits including said windings being adapted to cause the resultant of the coaxial magnetizations to increase in magnitude when the motor load increases.

6. A motor which carries variable load at synchronous speed, comprising, a primary member having a winding, a secondary member having coaxial windings in inductive relation to said primary winding, a commutator cooperating with said primary winding, adapted to make available auxiliary voltages which are of slip frequency near synchronism and unidirectional at synchronism, and displaced brush sets bearing on said commutator and connected with said coaxial windings and adapted to impress on said windings auxiliary voltages of such phase as to produce near synchronism a synchronizing torque and at synchronism a resultant unirectional magnetization which increases with increasing synchronous load.

7. A motor which carries variable load at synchonous speed, comprising, a primary member having a winding, a secondary member having coaxial windings in inductive relation to said primary winding, a commutator cooperating with said primary winding, adapted to make available auxiliary voltages which are of slip frequency near synchronism and unidirectional at synchronism, and displaced brush sets bearing on said commutator and connected with said coaxial windings, said brush sets being positioned to impress on said coaxial windings voltages of substantially less than quadrature phase relation to the voltages induced in said coaxial windings near synchronism.

8. A motor which carries variable load at synchronous speed, comprising, a primary member having a winding, a secondary member having coaxial windings in inductive relation to said primary winding, a commutator cooperating with said primary winding, adapted to make available auxiliary voltages which are of slip frequency near synchronism and unidirectional at synchronism, and displaced brush sets bearing on said commutator and connected with said coaxial windings, said brush sets being positioned to impress on said coaxial windings voltages of substantially less than quadrature phase relation to and leading the voltages induced in said coaxial windings near synchronism.

9. A motor which carries variable load at synchronous speed, comprising, a primary member having a winding, a secondary member having coaxial windings in inductive relation to said primary winding, a commutator cooperating with said primary winding, adapted to make available auxiliary voltages which are of slip frequency near synchronism and unidirectional at synchronism, and displaced sets of brushes bearing on said commutator, each set being connected to one of said secondary windings and displaced from the axis thereof.

10. A motor which carries variable load at synchronous speed, comprising, a primary member having a winding, a secondary member having coaxial windings in inductive relation to said primary winding, a commutator cooperating with said primary winding, adapted to make available auxiliary voltages which are of slip frequency near synchronism and unidirectional at synchronism, sets of brushes bearing on said commutator, each set being connected to one of said secondary windings and displaced from the axis thereof, and said sets being displaced from each other by an angle other than ninety electrical degrees.

11. A motor which carries variable load at synchronous speed, comprising, a primary member having a winding, a secondary member having coaxial windings in inductive relation to said primary winding, said primary member being adapted to produce auxiliary voltages which are unidirectional at synchronism, and means for impressing the auxiliary voltages on said secondary windings, the ratio of ampereturns produced in said secondary windings differing from the ratio of the voltages impressed thereon.

12. A motor which carries variable load at synchronous speed, comprising, a primary and a secondary member without defined polar projections, the primary member having a winding adapted to produce a primary flux which revolves with respect to the primary, means including two displaced brush sets for causing the primary flux to produce two auxiliary voltages, substantially coaxial exciting and compounding windings on the secondary member, said brush sets being so connected and positioned that the positive maxima of the resultant synchronizing torque produced by said windings exceed the negative maxima thereof.

13. A motor which carries variable load at synchronous speed, comprising, a primary and a secondary member without defined polar projections, the primary member hav- a winding adapted to produce a primary flux which revolves with respect to the primary, means including two displaced brush sets for causing the primary flux to produce two auxiliary voltages, substantially coaxial exciting and compounding windings on the secondary member, said brush sets being so connected and positioned and the exciting and compounding windings so dimensioned that the positive maxima of the resultant synchronizing torque produced by said windings exceed the negative maxima thereof.

14. A motor which carries variable load at synchronous speed, comprising, a primary and a secondary member without defined polar projections, the primary member having a winding adapted to produce a primary flux which revolves with respect to the primary, means including two displaced brush sets for causing the primary flux to produce two auxiliary voltages, substantially coaxial exciting and compounding windings on the secondary member, one set of brushes being connected to the exciting and the other to the compounding winding, said windings being so dimensioned that for equal brush voltages the ampereturns in the compounding would be greater than in the exciting winding.

15. A motor which carries variable load at synchronous speed, comprising, a primary and a secondary member without defined polar projections, the primary member having a winding adapted to produce a primary flux which revolves with respect to the primary, means including two displaced brush sets for causing the primary flux to generate two auxiliary voltages which become unidirectional at synchronism, substantially coaxial exciting and compounding windings on the secondary member, one set of brushes being connected to the exciting and the other to the compounding winding and the ratio of the unidirectional ampereturns in the two windings differing in synchronous operation from the ratio of the brush voltages producing said ampereturns.

16. In a motor which carries variable load at synchronous speed, a primary and a secondary without defined polar projections, a commuted and another winding on the primary, said other winding being adapted for connection to an alternating current supply, two displaced sets of brushes carried by the secondary and co-operating with the commuted winding on the primary, a compounding and a substantially coaxial exciting winding on the secondary, each of said coaxial windings being connected to one set of brushes, that set which is connected to the exciting winding being displaced from the perpendicular to the axis of said winding.

17. In a motor which carries variable load at synchronous speed, a primary and a secondary without defined polar projections, a commuted and another winding on the primary, said other winding being adapted for connection to an alternating current supply, two sets of brushes carried by the secondary and co-operating with the commuted winding on the primary, a compounding and a substantially coaxial exciting winding on the secondary, each of said coaxial windings being connected to one set of brushes, said brush sets being displaced by an angle other than ninety electrical degrees one from the other.

18. In a motor which carries variable load at synchronous speed, a primary and a secondary without defined polar projections, a commuted and another winding on the primary, said other winding being adapted for connection to an alternating current supply, two displaced sets of brushes carried by the secondary and co-operating with the commuted winding on the primary, a compounding and a substantially coaxial exciting winding on the secondary, each of said coaxial windings being connected to one set of brushes, both sets being displaced by less than ninety electrical degrees from the axis of the coaxial secondary windings.

19. In a motor which carries variable load at synchronous speed, a primary and a secondary without defined polar projections, a commuted and another winding on the primary, said other winding being adapted for connection to an alternating current supply, two sets of brushes carried by the secondary and co-operating with the commuted winding on the primary, a polyphase arrangement of windings on the secondary, one of said secondary windings being connected to one of the brush sets, another winding on the secondary coaxial with that connected to one brush set and itself connected to the other brush set, a resistance shunting one of the coaxial windings and another shunting a secondary winding located along another axis.

20. In a motor which carries variable load at synchronous speed, a primary and a secondary without defined polar projections, a commuted and another winding on the primary, said other winding being adapted for connection to an alternating current supply, two sets of brushes carried by the secondary and co-operating with the commuted winding on the primary, a polyphase arrangement of windings on the secondary, one of said secondary windings being connected to one of the brush sets, another winding on the secondary coaxial with that connected to one brush set and itself connected to the other brush set, the two brush sets being displaced by less than ninety electrical degrees one from the other and a resistance shunting a winding on the secondary displaced from the coaxial windings thereon.

21. In a motor which carries variable load at synchronous speed, a primary and a secondary without defined polar projections, a commuted and another winding on the primary, said other winding being adapted for connection to an alternating current supply, two sets of brushes carried by the secondary and co-operating with the commuted winding on the primary, a compounding and a substantially coaxial exciting winding on the secondary, each coaxial winding being connected to one set of brushes, the brushes connected to the compounding winding being positioned to collect a voltage of one direction at one load and a voltage of the opposite direction at another load.

22. In a motor which carries variable load at synchronous speed, a primary and a secondary without defined polar projections, a commuted and another winding on the primary, said other winding being adapted for connection to an alternating current supply, two displaced sets of brushes carried by the secondary and co-operating with the commuted winding on the primary, a compounding and a substantially coaxial exciting winding on the secondary, each coaxial winding being connected to one set of brushes, the brushes connected to the exciting winding being positioned to collect substantially less than the maximum available unidirectional voltage at no load.

23. A motor which carries variable load at synchronous speed, comprising, a primary and a secondary member without defined polar projections, the primary member being adapted for connection to an alternating current supply, means including two displaced brush sets for causing the primary flux to produce two auxiliary voltages, substantially coaxial exciting and compounding windings on the secondary member, one set of brushes being connected to the exciting and the other to the compounding winding, said windings being so dimensioned that for equal brush voltages the ampereturns in the compounding would be greater than in the exciting winding.

24. A motor which carries variable load at synchronous speed, comprising, a primary and a secondary member without defined polar projections, the primary member being adapted for connection to an alternating current supply, means including two displaced brush sets for causing the primary flux to generate auxiliary voltages which become unidirectional at synchronism, substantially coaxial exciting and compounding windings on the secondary member, one set of brushes being connected to the exciting and the other to the compounding winding, and the ratio of the unidirectional ampereturns in the two windings differing in synchronous operation from the ratio of the brush voltages producing said ampereturns.

25. A synchronous motor comprising, a primary member having a winding, a secondary member having coaxial windings in inductive relation to said primary winding, said primary member being adapted to produce auxiliary voltages which are unidirectional at synchronism, and means for impressing the auxiliary voltages on said secondary windings, the maximum number of ampereturns produced by one auxiliary voltage in one of the secondary windings differing from the maximum number of ampereturns produced by another auxiliary voltage in another secondary winding.

26. A synchronous motor comprising, a primary member having a winding, a secondary member having coaxial windings in inductive relation to said primary winding, said primary member being adapted to produce auxiliary voltages which are alternating at subsynchronous speeds and unidirectional at synchronism, and means for impressing the auxiliary voltages on said secondary windings, the number of ampereturns produced by the auxiliary voltage the phase of which at subsynchronous speeds more nearly approaches the phase of the voltage generated in the coaxial secondary windings being in excess of the ampereturns produced by the other auxiliary voltage.

27. A synchronous motor comprising, a primary member having a winding, a secondary member having two coaxial windings in inductive relation to said primary winding, said primary member being adapted to produce auxiliary voltages which are unidirectional at synchronism, two sets of brushes located along displaced axes to collect the auxiliary voltages each set being connected to one of the coaxial secondary windings, the set whose axis is nearest to the axis of the secondary windings being responsible for more ampereturns than the other set.

28. A motor which carries variable load at synchronous speed, having a primary and a secondary, circuit on the secondary in inductive relation to the primary, a source adapted to make available auxiliary voltages which near synchronism are of slip frequency and differ in phase and which become unidirectional at synchronism, and means for impressing different auxiliary voltages on different secondary circuits to produce unidirectional ampereturns in said circuits at synchronism, said circuits being so dimensioned that for auxiliary voltages of equal magnitude the ampereturns in one secondary circuit exceed the ampereturns in another secondary circuit.

29. The method of operating a motor which carries variable load at synchronous speed, comprising, producing a primary flux which revolves with respect to the primary, causing the primary to generate induction-motor-torque producing ampereturns in a secondary circuit, producing two auxiliary voltages of slip frequency, of an amplitude independent of their frequency, which differ in phase below synchronism and become unidirectional at synchronism, impressing one of these auxiliary voltages on the secondary circuit to produce a synchronizing torque and a unidirectional magnetization at synchronism, and impressing the other auxiliary voltage on another secondary circuit to produce another unidirectional magnetization at synchronism which is substantially coaxial with the first unidirectional magnetization.

In testimony whereof I affix my signature this 16th day of February, 1924.

VALÈRE ALFRED FYNN.